United States Patent [19]

Arnold

[11] 4,141,653
[45] Feb. 27, 1979

[54] SPECTROGRAPHIC APPARATUS

[76] Inventor: Frederick A. Arnold, 1716 30th St., San Diego, Calif. 92102

[21] Appl. No.: 766,136

[22] Filed: Feb. 7, 1977

[51] Int. Cl.$^2$ ............................ G01J 3/48; G01J 3/46; G02B 5/22; G01J 3/10
[52] U.S. Cl. .................... 356/419; 356/404; 350/317; 355/32; 356/420
[58] Field of Search .............. 356/190, 189, 175; 355/32; 350/317

[56] References Cited

U.S. PATENT DOCUMENTS

| 3,083,614 | 4/1963 | Veit | 356/175 X |
| 3,885,879 | 5/1975 | Louder et al. | 356/189 |

*Primary Examiner*—Vincent P. McGraw
*Assistant Examiner*—Rodney B. Bovernick
*Attorney, Agent, or Firm*—Frank D. Gilliam

[57] ABSTRACT

The device is housed in an enclosure impervious to light of a selected frequency spectrum. The housing contains a light source of the same frequency spectrum and a pair of translatable filter holders. Each of the filter holders contain different chromic absorption filters positioned in a side-by-side relationship in the direction of translation. The chromic absorption filters are arranged with a color filter on one end of the holder and its color filter complement on the other end. A second embodiment contains an achromic or neutral filter positioned between the complementary chromic filters. The filters of each holder have vertical alignment when one is superposed over the other. A mask is provided between the filter holding means for allowing light from the source to pass through an area equal to approximately the width of one chromic filter. Thus, this light is then directed toward a color positive for correct light balancing. A viewing port for operator viewing covered with etched glass or the like receives reflected light from the color positive through a variable area aperture. A scale is provided to reference the position of each filter slide when translated for correct color balancing.

9 Claims, 5 Drawing Figures

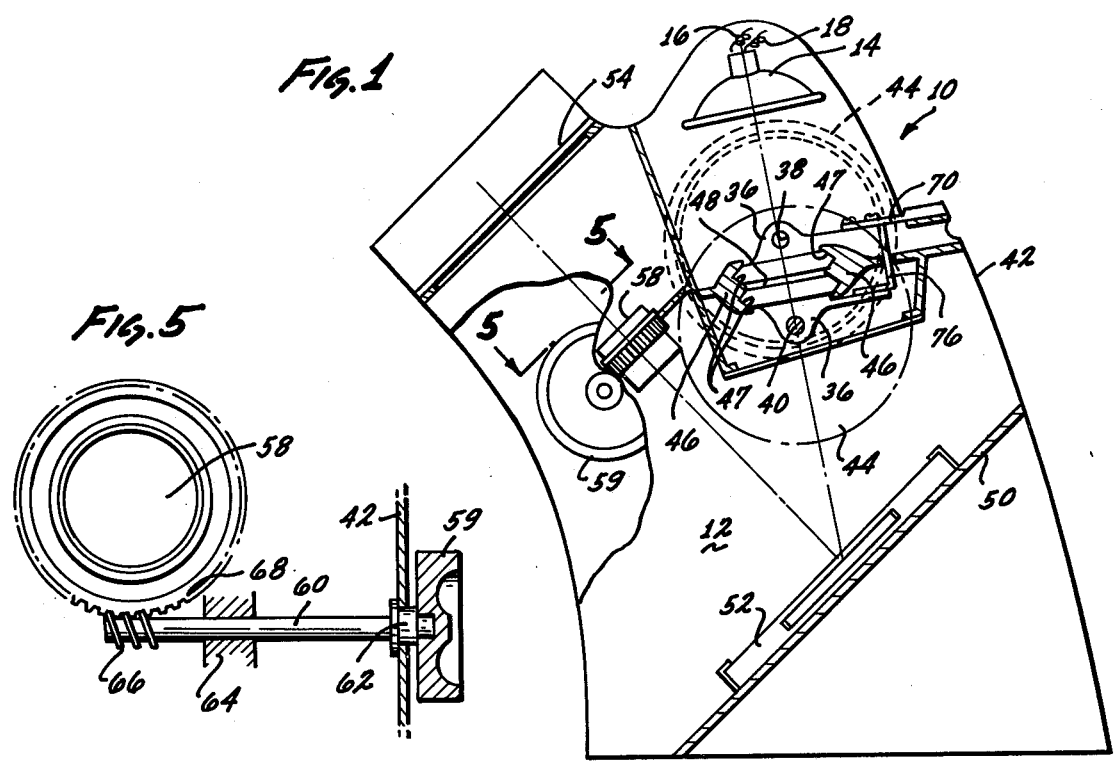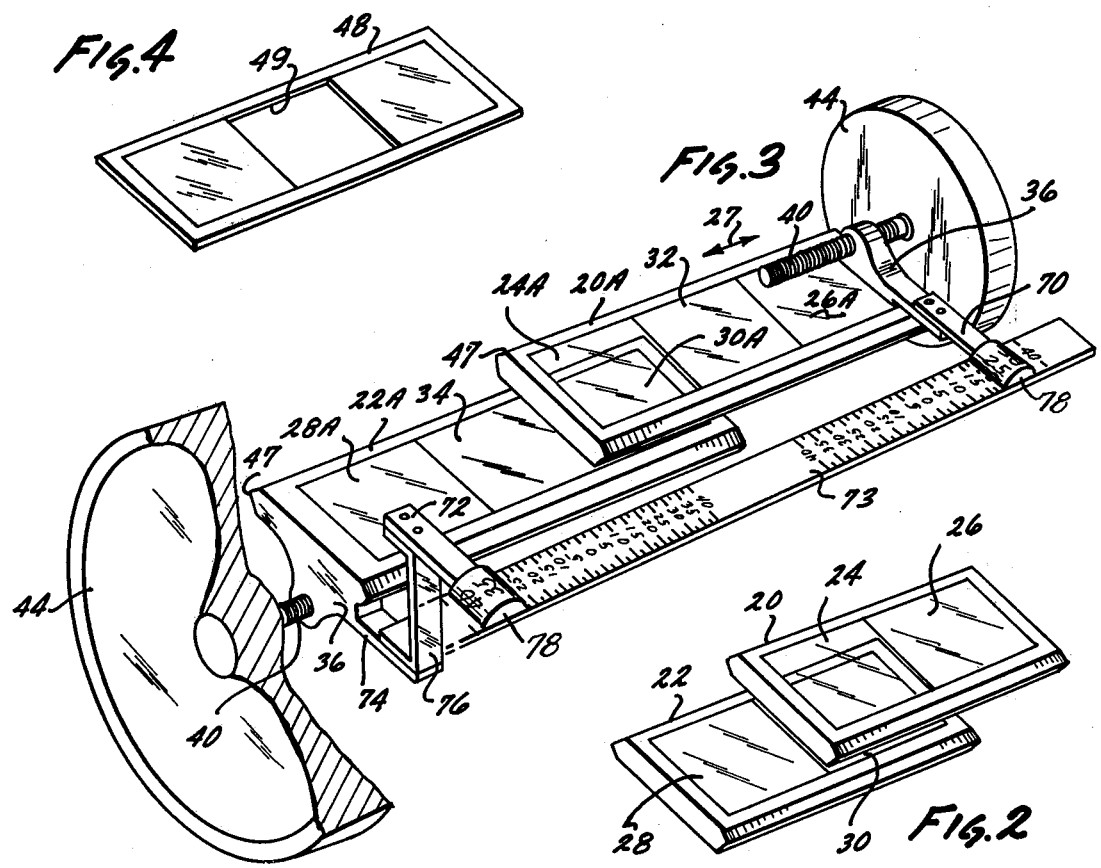

SPECTROGRAPHIC APPARATUS

BACKGROUND OF THE INVENTION

This invention relates to a spectral light metering and mixing system for use in the production and reproduction of color photographs of all kinds, and also in color analyzing, metering and calibrating apparatus used in photographic, graphic, scientific, and other related disciplines. Almost without exception, state of the art spectrographic systems depend upon the so-called color triangle theory. This theory teaches that all colors of the visible spectrum lying roughly between 4000 and 7500 Angstrom Units can be produced by the use of the spectra of red, blue, and green, or alternately by the secondary or substractive colors of yellow, magenta, and cyan produced by mixing adjacent colors of the primary triangle. The color triangle spectra may be produced by three individual sources of appropriate frequencies, or it may be produced by absorption filters of appropriate hues exposed to the beam of a white light source of the appropriate spectrum. It may also be produced from a white light source of the appropriate spectrum by reflections from colored mirror surfaces or the bending of the light through colored prisms.

The operator of any of the various spectral devices designed about the primary color triangle or its alternate secondary form, must have a good working knowledge of color theory as well as technical knowledge related to the operation of the particular manual operated except when operating automatic equipment used in production-line photographic reproduction. Here, optical sensing devices are employed to determine the intensity and spectral distribution necessary to approximate a correct exposure. Such automatic equipment is large, complicated and expensive to acquire and maintain and is accident-prone. Such automatic equipment is confined almost exclusively to production line photo finishing plants catering to the popular snap-shot trade. The order of color accuracy of the automatic equipment is too low for commercial or professional requirements and such equipment is generally not suited for the making of various different size enlargements.

In operation of all state of the art spectrographic equipment utilizing color absorption filters other than automatic equipment, the operator must manually establish a spectral balance between all three colors of the triangle. He may introduce either no filter, a single filter, or a combination of any two at his discretion. All three filters cannot be introduced into the beam of white light at the same time as this would result in partial or total absorption of the light spectrum.

Substantially all of the color analyzing equipment currently in use is actually a form of a densiometer which affords no visual preview of the proposed finished photograph, but simply presents galvanometer readings related to density curves. Such readings must be translated to the filter selection by the operator subject to his knowledge, skill and experience.

In operation of state of the art spectrographic apparatus, confusion can arise in the mind of even the skilled operator. This is especially true of photographic apparatus employing white light sources and absorption filters. The subtractive filter configuration which is commonly employed consists of yellow, magenta, and cyan filters. Since cyan is the opposite of the combined values of both yellow and magenta, that is, it absorbs both spectra, great care must be exercised when working in the cyan range. Each advance of the cyan filter can necessitate a corresponding increase of either yellow or magenta, yet at other times may not.

State of the art color analyzers of all existing types must be laboriously "programmed" in advance of initial use, requiring the making of prior photographic test prints by guesswork to develop the program calibrations. Programs must be developed for various types of negatives and for each color programed into the apparatus. Should any variations occur anywhere along the total photographic reproductive chain, all the analyzer programs are rendered useless, necessitating the reestablishment of the entire series of tests and programing. In any event, all programs are subject to gradual deterioration and eventual loss. Causes for the gradual decay and ultimate loss of all programs are these: Electronic drift caused by the absorption of moisture, aging of electronic components, deterioration of cathod ray tubes, etc. Chemical drift induced by oxidation, constant depletion and replacement of the various processing chemicals by replenishment. Temperature drift of the analyzer, the photographic paper and the chemistry.

Over and beyond the gradual drifts, abrupt changes can totally nullify the analyzer programs. Such changes as replacement of components, introduction of new paper emulsions, complete replacement of the photographic chemistry due to aging or accidental contamination, etc.

Probably the greatest deficiency of all state of the art analyzers, regardless of costs and expense of operation is the total lack of follow-up capabilities. If the final photograph is faulty, it is not possible to re-analyze the results and apply further correction. Such further corrections must be accomplished by the eyes of a skilled color technician working with hand-held viewing filters and personal judgment.

These and other problems were not satisfactorially resolved until the emergence of the instant invention.

SUMMARY OF THE INVENTION

The instant invention has eliminated substantially all of the deficiencies hereinbefore cited and affords many advantages over apparatus employing the color triangle theory. As opposed to the usual three translatable filter mechanisms associated with state of the art apparatus, the instant invention necessitates only two translation filter mechanisms which require only two scales to reference the movements of the mechanisms. In the first embodiment, a pair of chromatic filters consisting of a color and its complement are arranged side-by-side in the direction of translation, and in a second arrangement, a pair of complementary chromatic filters are arranged with the chromatic filters on each side of an achromatic filter placed therebetween.

For the preferred embodiment illustrated, the selection of the filters are blue and its complement yellow, for one filter transport, and magenta with its complement, green for the other. Selection of the filter to practice the invention is not limited to these particular hues or combination of hues. This particular selection merely provides control of the white light spectrum to produce or limit any hue within the frequency range of the spectrum.

Accidental achromatic cancellation, that is, undesirable neutralizing of the chromatic filters is not physically possible. Mathematical problems are not introduced when working in the green, blue, or green-blue (cyan) frequencies. Light levels remain constant regardless of the positions of the filters with respect to that portion of the source light which passes through the filters and impinges upon the viewed subject. Colors or over-all color balance is not dictated by preestablished programs, but, rather is established by the operator guided by an actual view of the subject. All adjustments are referenced by scales adjacent the filters to provide usable information for the purpose of reproducing photographically an accurate representation of the subject analyzed. No technical training is required of the operator. The purposes of the additional achromatic or neutral filter is to spread out the reference scales for increased accuracy and to provide automatic light-level control in the three-filter configuration. In the two-filter configuration, such automatic light-level control is provided by the chromatic filters. Any frequency or frequency-combination within the source spectrum can be accurately produced by means of properly chosen pairs of complementary filters. Any frequency or frequency-combination within the source spectrum can be accurately referenced with just two scales. This is true because of the following well known teachings of James Clerk Maxwell.

The main object of the invention is to produce a spectrographic apparatus which can be embodied in photographic, optical, and scientific devices, and which can be operated with a high degree of success by an untrained operator.

Another object of the invention is to produce an inexpensive spectrogaphic device for the mixing, referencing, and analyzing of light frequencies.

Another object of the invention is to produce color photographs of accurate color balance.

Another object of the invention is to produce a spectrographic apparatus which can be used with equal facility to produce color photographs from either negative or positive films and prints.

Still another object of the invention is to provide a spectral device which, when embodied as a color analyzer, will incorporate all variables of the processing, automatically programming itself with each test.

Another object of the invention is to provide a spectral apparatus which incorporates follow-up capabilities when used as a color analyzer.

Another object of the invention is to provide a spectral apparatus which may be employed in producing a correctly color balanced positive photograph directly from another positive photograph.

The above and other specific features of the instant invention will be readily apparent as the description continues and while read in conjunction with the appended drawings which relate exclusively to the color analyzer embodiment.

BRIEF DESCRIPTION OF THE DRAWINGS

FIG. 1 shows a partial cutaway side view of the device of the instant invention.

FIG. 2 shows filter holding means from one embodiment of the device.

FIG. 3 shows filter holding means from a second embodiment of the device and filter holding means translating mechanism and a graduated scale common to both embodiments.

FIG. 4 shows a second view of the light mask of FIG. 1.

FIG. 5 shows a portion of FIG. 1 taken along lines 5—5.

DESCRIPTION OF THE PREFERRED EMBODIMENT

The same reference numerals are used throughout the specification and drawings to denote the same element or part.

Referring now specifically to FIG. 1, a partial cutaway showing of the hue mixing apparatus 10 is shown. The apparatus is housed in a housing 12 which may be constructed of any suitable material that is substantially impervious to visual light, such as, but not limited to, metal, plastic, wood or the like. The upper portion of the housing 12 contains a fixed frequency source of light 14 which is corrected to optimum color temperature for viewing positive transparencies well known in the photographic art. The light can be powered by any convenient regulated voltage source, not shown, through wires 16, 18. Generally, the circuit will include a switch for controlling the regulated power to the light for selective light operation.

A pair of filter holding means 20, 22 or 20a, 22a are positioned below and adjacent the source of light 14.

In the FIG. 2 embodiment of the filter holding means 20, 22, each holding means carries two abutting filters 24, 26; 28, 30.

In the FIG. 3 embodiment of the filter holding means 20a, 22a, there is additionally included a third filter 32, 34 respectively carried thereby.

In the FIG. 2 configuration, filters 24, 26 have complimentary colors (substractive) and filters 28, 30 are different complementary colors. Examples would be for filter 24, green; filter 26, magenta; filter 28, blue and filter 30, yellow.

In the FIG. 3 configuration, additional light intensity is provided by the addition of an achromatic filter element 32, 34 to each of the combinations hereinafter discussed. The filters would be positioned in the following sequence along the holding means. Filter 24a would be complementary to 26a (as above for example, green and magenta, respectively) filter 32 would be achromatic or neutral filter 28a would be complementary to 30a (as above, for example, blue and yellow), filter 34 would be achromatic or neutral (a duplicate of 32).

It is important that the various filters chosen have substantially identical transition loses. It should be understood that other pairs of different complementary colors may be utilized to practice the invention when different light spectrums are chosen.

Referring now to FIG. 3, either holding means 22, 24 or 22a, 24a is translatable along arrows 27 by any convenient moving and guiding means. The configuration of the holding means and support guides must allow for separate relative movement of the holding means along parallel planes so that the filter hold-means 24 or 24a will superpose filter holding 22 or 22a, respectively, so that the various filters will align vertically. Translating of the filter holding means may be provided as shown in FIG. 3 or by any other convenient means. The holding means as shown in FIG. 3, includes support members 36. These support members have threaded elongated apertures 38 therethrough extending in the direction of the translation of the holding means. Screw means 40 threadedly engage aperatures 38 and extend through the outer wall 42 of the housing 12 where the outward extending end is fixedly secured to a control wheel 44. The outward extending end of the screws are rotatably secured to the outer wall 42 so that rotation of control wheel 44 causes its associated filter holding means to translate along arrow 27 with respect to its associated screw. The center of the range of each screw movement places each filter of one set of filters vertically in line with each filter of the outer set.

Secured to the inner portion of the structure of the housing 12 are a pair of guide brackets 46. These mate with the filter holding means protrusion 47 so that the filter holding means are guided in their translation along the recession acting as a track for guiding pertrusion 47.

Positioned between the filters and fixedly secured to the brackets 42 is a masking plate 48 (see FIGS. 1 and 4). The masking plate 48 allows the light from the source 14 to pass only through the filters at opening 49 between its longitudinal end surfaces. This opening 49 is generally equal in size to one filter carried by each filter holding means.

Between the filters and the bottom of the housing 12 is a platform 50 for holding an object 52 for receiving the filtered light from the source. The platform is angled so that the light from the source is reflected from the object toward the viewing screen 54 made of etched glass or the like.

Positioned between the object 52 and the viewing screen 54 is an adjustable aperture 58. Any variable aperture for adjusting the amount of direct light from the object may be utilized. An example is shown in FIGS. 1 and 5. The size of aperture 58 is varied by operator operation of knob 59 positioned external of wall 42 of the housing 12. The knob is fixedly attached to a shaft 60 passing through the housing outer wall 42. The shaft 60 is rotatable with respect to the housing within bushing 62, 64 (bushing 64 being fixedly attached to the housing by any convenient means not shown). The end of the shaft remote from the knob includes a worm gear 66 which engages ring gear 68 which in turn varies the cross-sectional size of the aperture 56.

Referring now specifically to FIG. 3, each of the support members 36 have an extension 70, 72 for supporting a scale 73 to indicate the specific length of translation of its associated filter holding means from a known reference point when its associated control wheel 44 is rotated. The lower filter holding means further includes an extension 74 and a double right angle bracket 76 so as to place the scale indicator of both filter holding means on substantially the same plane which is parallel to the filter holding means. The scale 73 is fixed in position adjacent the filter holding means and has standard graduations therealong. The scale may be conveniently marked to indicate the center of the filter holding means span of translation. This may generally be considered zero or reference. The graduation on either side of zero may be marked plus and minus or the like for convenience. A magnifying lens 78 may be utilized on the ends of extension 70, 72 to ease operator readings of the graduation.

OPERATION OF THE PREFERRED EMBODIMENT

The original test print is produced from a color transparency or negative by means of a trial printing pack. It is well known in the art that a starting pack is based upon the type of film being used. To produce a satisfactory print from a trial printing pack would depend solely on chance. The print produced will, however, be in the color range of the spectrographic apparatus of the instant invention. The working range of the invention of the instant apparatus is approximately plus and minus 30cc of filteration. This range is satisfactory for substantially all color variations of a test print. In any instance where the print is out of range of the apparatus correction can still be applied in such a manner so as to predict the proper application of corrective filters.

The source of light 14 is energized and allowed to stabilize. The light is directed through opening 49 of masking plate 48. The control wheels 44 associated with both of the filter holding means are rotated until the filters of the two are vertically aligned and the indicator carried by extensions 70, 72 are aligned with the references or zero gradient. The light is now directed through the center of the holding means toward the object 52. While the operator views the object, the control wheels are turned introducing more or less of the various filters until the filtered light causes the object to appear, to the operator, to be of the correct or desired hue for printing. The scale settings are now read and the degree of movement of each filter holding means from its initial reference setting is applied to the printing or enlarging means as corrections to the trial printing pack so that a correctly balanced print can now be produced.

It should be understood that although the specific embodiment hereinbefore described relates to use with color photography that the invention is not so limited and can be practiced equally as well in the area of photographic printing, enlarging, projecting, and duplicating, graphic arts, the ink and dye industries, scientific work involving controlled lighting, lighting systems, lighting systems for microscopes, the fabrics and textile industry, the paint and paint pigment industry and the like where visual mixing of hues of the spectrum are required.

It will be understood that changes and modification may be made to the structure described above without departing from the spirit and scope of the invention as set forth in the claims appended hereto.

Having thus described the invention, what is claimed as new and useful and desired to be secured by United States Letter Patent is:

1. A device for the mixing of hues of the light spectrum to provide the correct color to an object comprising:
    a light source for producing a light of a selected spectrum;
    first and second filter holding means translatable relative to each other;
    each of said holding means includes a like scale means for referencing the relative position of said filter holding means after movement from a predetermined position;
    said first filter holding means having a first and second filter element positioned in a side-by-side relationship;
    said second filter holding means having a third and fourth filter element positioned in a side-by-side relationship;
    said first and second filter elements having complementary first colors;
    said third and fourth filter elements having complementary second colors;
    said filter elements of said first and second holding means being in substantial alignment when positioned one over the other;
    said light is directed through at least a portion of a filter element of each of said filter means toward said object; and means for viewing the light from said source when reflected from said object.

2. The invention as defined in claim 1, wherein means are provided for remotely translating said filter holding means.

3. The invention as defined in claim 1, wherein a fifth filter element having a third neutral color is positioned between filter one and two and three and four on their respective holding means.

4. The invention as defined in claim 1, wherein said first filter element is green, said second filter element is magenta, said third filter element is yellow and said fourth filter element is blue.

5. The invention as defined in claim 1, additionally comprising a positioning means for said object wherein said directed light is reflected from said object toward said viewing means.

6. The invention as defined in claim 1, wherein a mask member with an aperture therethrough of substantially the same size as a filter element is fixedly positioned between said filter holding means.

7. The invention as defined in claim 1, wherein said filters have substantially identical transmission loss.

8. The invention as defined in claim 3, wherein said filters have substantially identical transmission loss.

9. The invention as defined in claim 1, wherein an aperture of variable cross-section is positioned between said object and said viewing means.

* * * * *